March 28, 1944.   E. J. KARP   2,345,266
MIXING MACHINE
Filed April 25, 1941   6 Sheets-Sheet 1

Inventor:
Edward J. Karp
By: Brown, Jackson, Boettcher & Dienner
Attys.

March 28, 1944.  E. J. KARP  2,345,266
MIXING MACHINE
Filed April 25, 1941   6 Sheets-Sheet 2
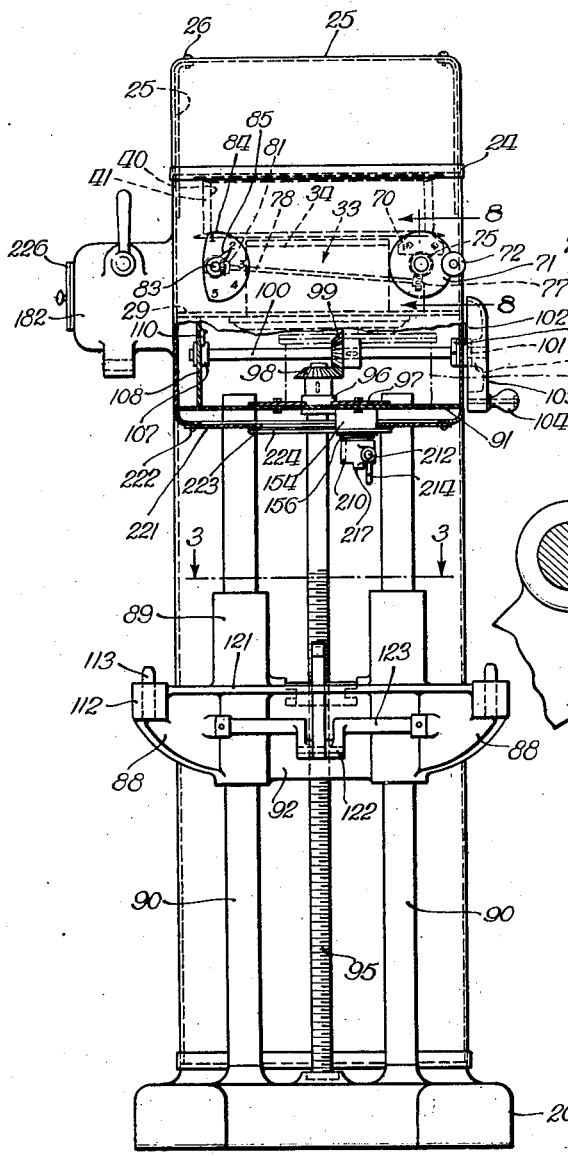
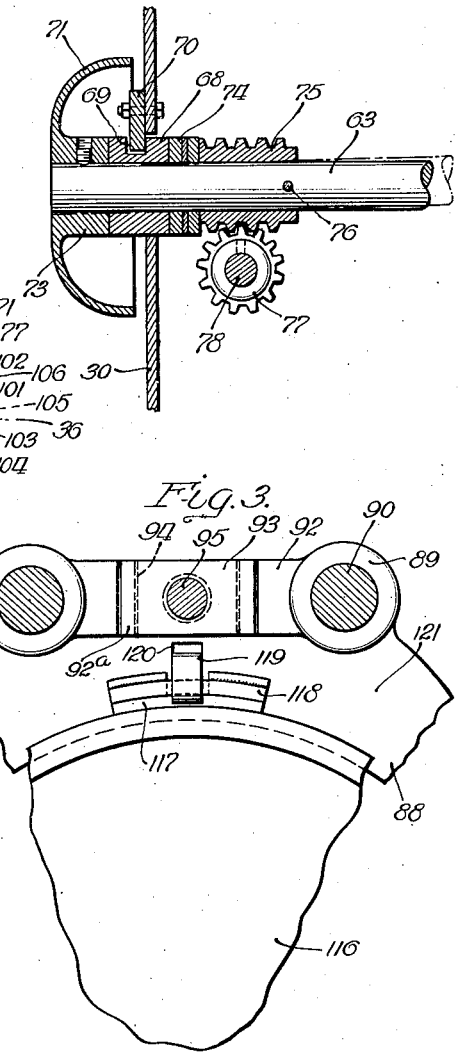
Inventor:
Edward J. Karp

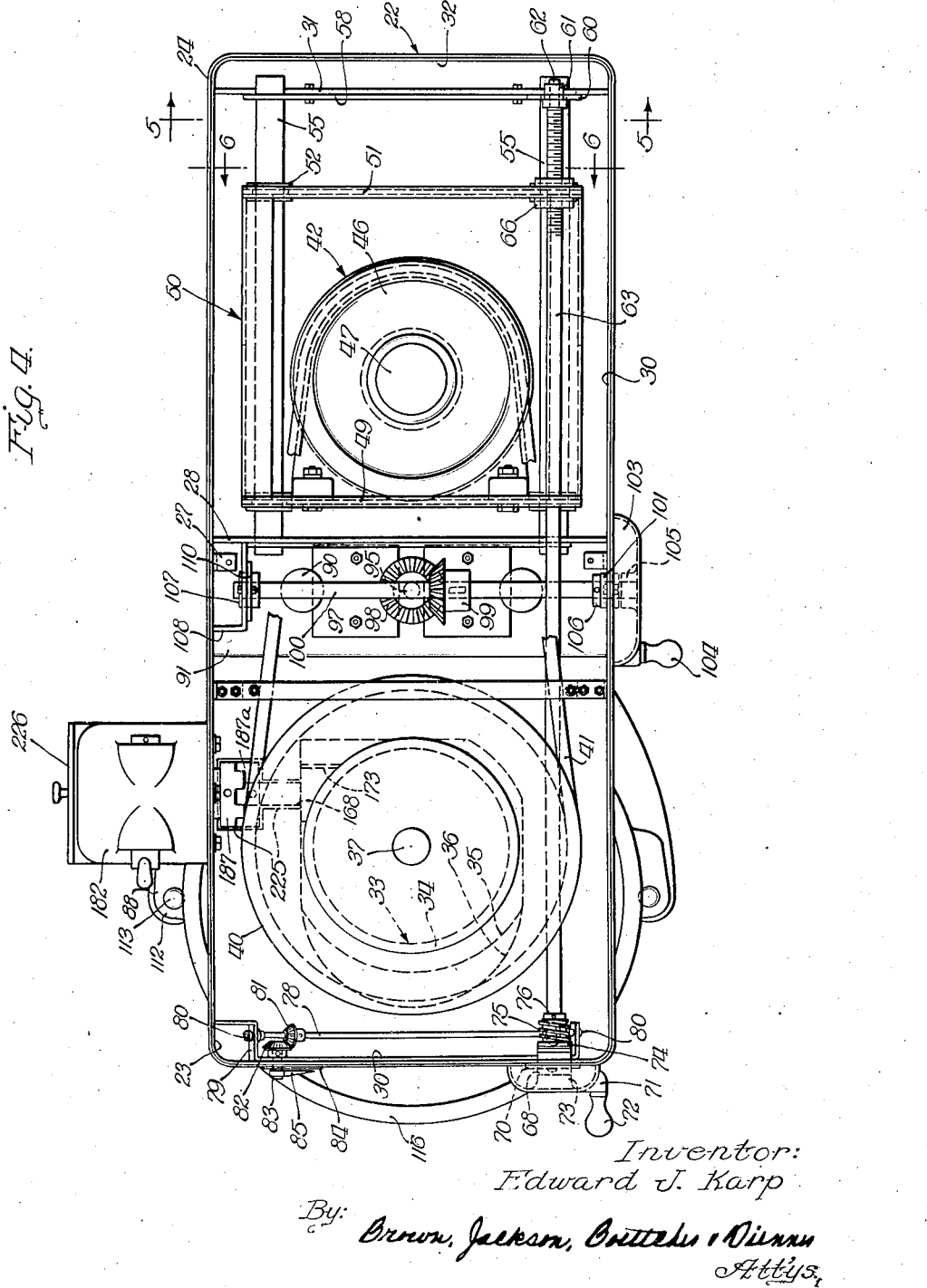

March 28, 1944. E. J. KARP 2,345,266
MIXING MACHINE
Filed April 25, 1941 6 Sheets-Sheet 4
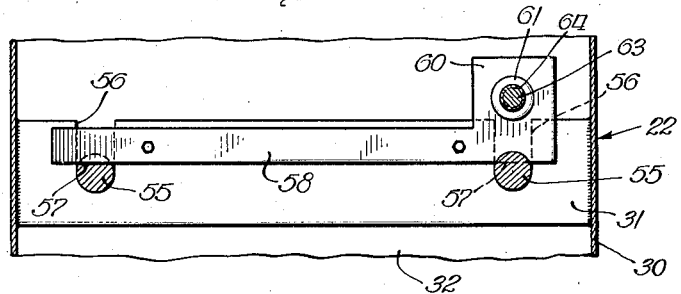
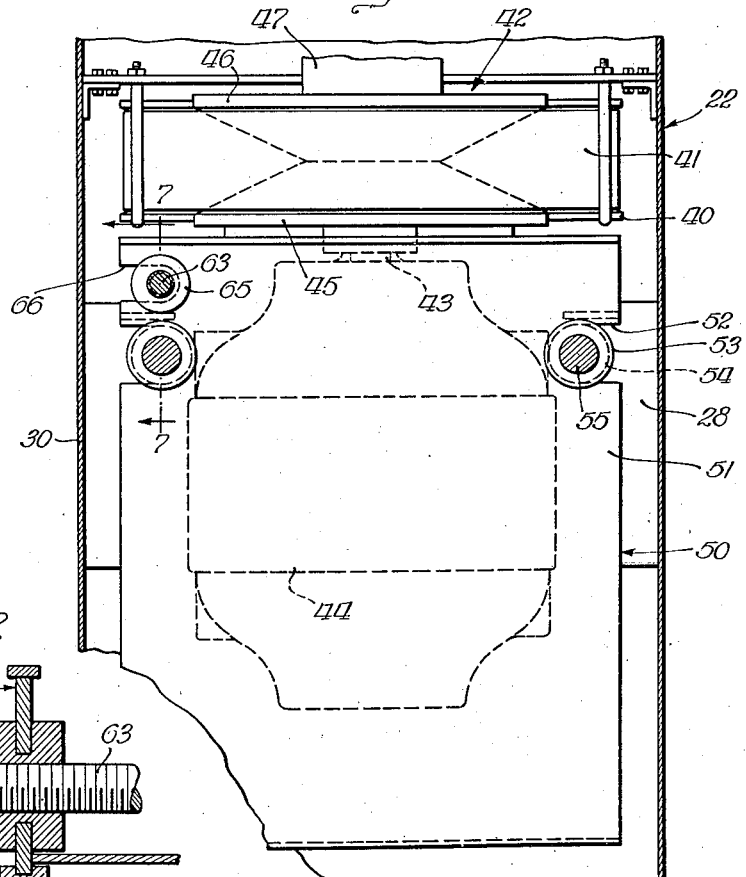
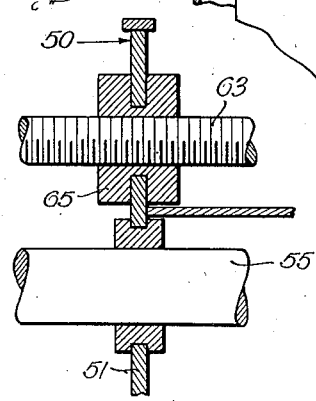
Inventor:
Edward J. Karp
By: Brown, Jackson, Boettcher & Dienner
Attys.

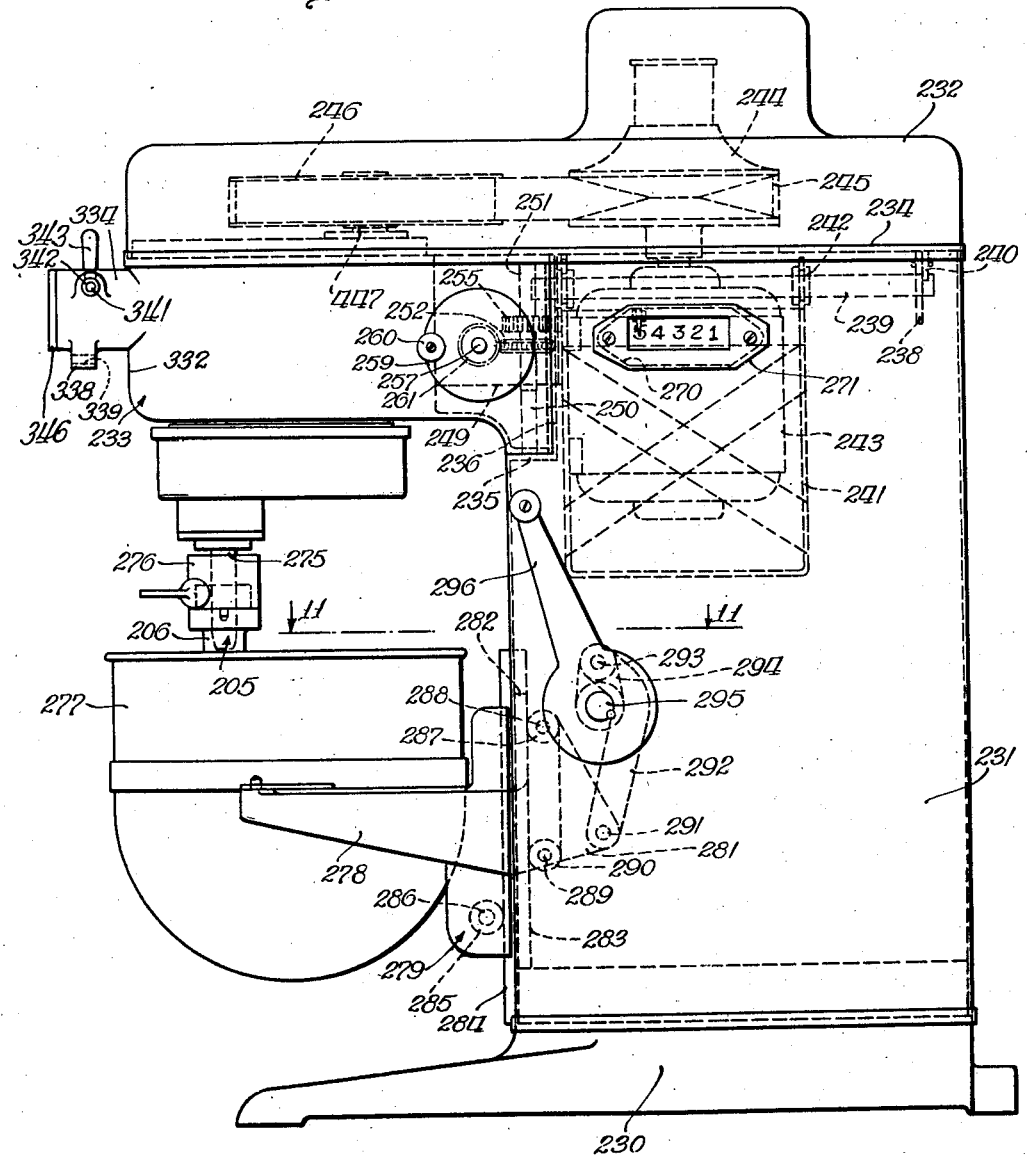

March 28, 1944. E. J. KARP 2,345,266
MIXING MACHINE
Filed April 25, 1941 6 Sheets-Sheet 6

Inventor:
Edward J. Karp
By:
Brown, Jackson, Boettcher & Dienner
Attys.

Patented Mar. 28, 1944

2,345,266

UNITED STATES PATENT OFFICE 2,345,266

MIXING MACHINE

Edward J. Karp, Cicero, Ill., assignor to G. S. Blakeslee & Co., Cicero, Ill., a corporation of Illinois Application April 25, 1941, Serial No. 390,229

12 Claims. (Cl. 74—230.17)

This invention relates to mixing machines, and has to do with machines for use in restaurants, hotels, and other establishments in the mixing and treatment of comestibles.

My invention is directed to a machine of the character stated of comparatively simple and inexpensive construction, which is durable and may be operated at any one of an infinite number of speeds, within limits, to suit requirements. More specifically, I provide a driven shaft for reception of various attachments and a drive shaft, the latter being driven from a motor through a driving connection variable in speed by adjustment of the motor relative to the drive shaft, means being provided for supporting and adjusting the motor while permitting removal and replacement thereof with expedition and facility. Further objects and advantages will appear from the detail description.

In the drawings:

Figure 2 is a front view of the machine of Figure 1 with the lower portion of the head housing broken away and the lower gear housing of the transmission unit omitted for clearness of illustration, certain parts being shown in section and certain other parts being shown in elevation; the mixing bowl being omitted;

Figure 3 is a detail fragmentary sectional view taken substantially on line 3—3 of Figure 2, on an enlarged scale;

Figure 4 is a plan view of the machine of Figure 1, with the cover of the head housing removed;

Figure 5 is a sectional view, on an enlarged scale, taken substantially on line 5—5 of Figure 4;

Figure 6 is a sectional view, on an enlarged scale and partly broken away, taken substantially on line 6—6 of Figure 4;

Figure 7 is a detail sectional view, on an enlarged scale, taken substantially on line 7—7 of Figure 6;

Figure 8 is a fragmentary sectional view, on an enlarged scale, taken substantially on line 8—8 of Figure 2, certain parts being shown in elevation;

Figure 9 is a side view of a modified form of mixing machine embodying my invention;

Figure 1:
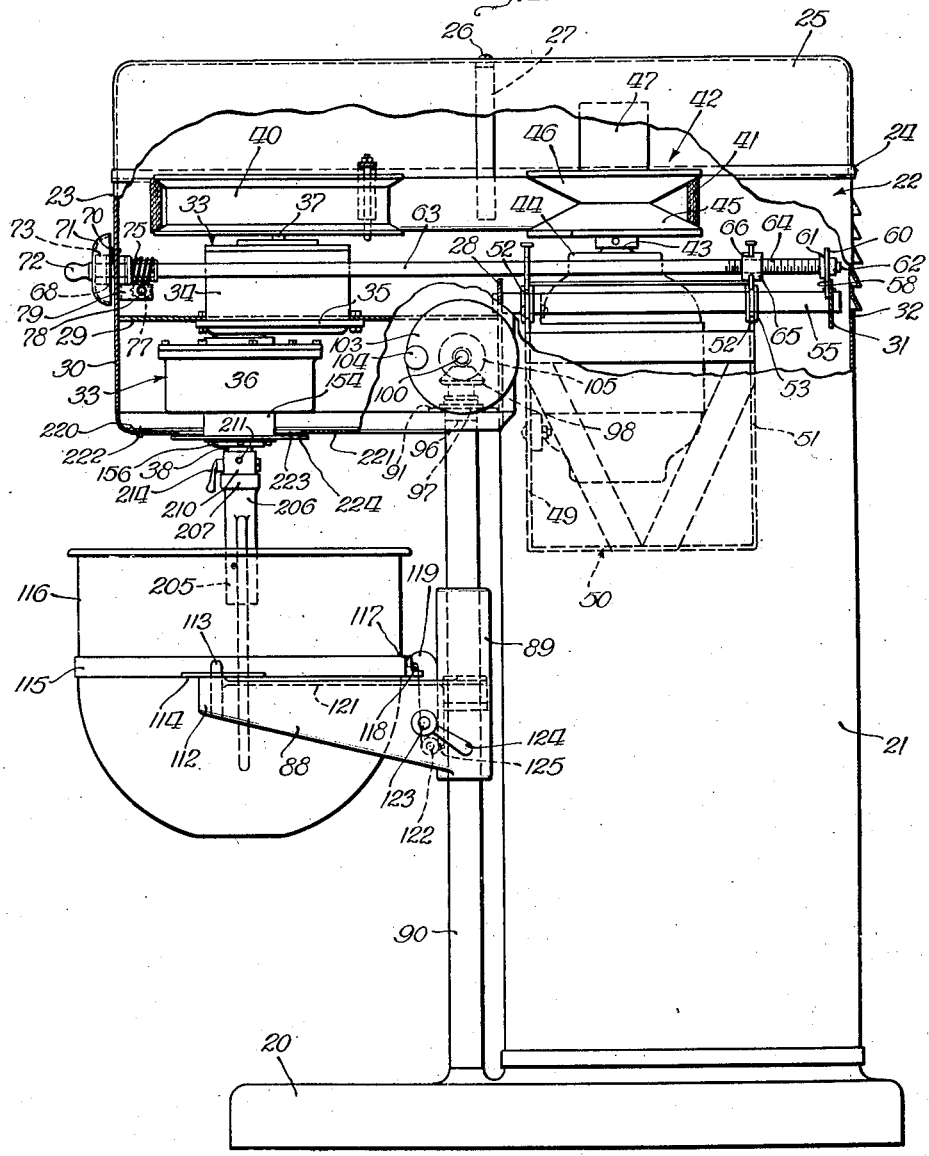
Figure 1 is a side view of a mixing machine embodying my invention, with parts broken away and other parts shown in section.

The machine illustrated in Figures 1 to 8, inclusive, comprises a base 20, which may be in the form of a casting. A column 21, of substantially rectangular cross section, is mounted upon base 20 and secured thereto in any suitable manner, conveniently by bolting. The upper portion of column 21 is formed to provide a head in the form of a housing 22, the forward portion of which provides an overhang 23 projecting forward from the front vertical wall of column 21. The column 21 and head 22, including the overhang 23, is formed of sheet or plate steel, the elements thereof being secured together in a suitable manner, preferably by welding. An upwardly projecting flange 24 is welded to the upper end of head 22, about the periphery thereof, and receives the lower edge portion of a box-like cover 25, also preferably formed of sheet or plate metal, which seats upon the upper edge of head 22. Cover 25 is removably secured in position by two screws 26 passing therethrough and threading into the upper arms of two inverted L-shaped brackets 27 welded at their lower portions to the inner surface of head 22 at opposite sides thereof. It will be understood that, within the broader aspects of my invention, the column 21, including head 22 and overhang 23 thereof, and the cover 25 may be otherwise constructed and related, though the sheet or plate metal construction is preferred as conducive to light weight while assuming adequate strength.

A reinforcing plate 28 extends on edge across the rearward end of the lower portion of overhang 23, this plate being disposed substantially in the plane of the front wall of column 21 and being welded to the latter and to head 22 thereof. A horizontal diaphragm plate 29 extends between the side walls of overhang 23 and between plate 28 and the front wall of the overhang, this plate being welded to plate 28 and to the side and front walls of overhang 23. The plates 28 and 29 effectively reinforce the overhang and the column 21 at the juncture thereof with overhang 23. Column 21 is further reinforced by a cross plate 31 extending transversely of head 22 adjacent rear wall 32, this plate 31 being disposed on edge and welded to the side walls of the head portion of the column.

Overhang 23 of head 22 provides a housing for a transmission unit 33. This unit comprises an upper gear housing 34, which fits through a corresponding opening in diaphragm plate 29 and extends upward above that plate, a flange 35 at the lower end of housing 34 bolted to plate 29 at the under face thereof, a lower gear housing 36 supported from gear housing 34, a drive shaft 37 extending upward from gear housing 34, a driven shaft 38 extending downward from gear housing 36, and means for driving shaft 38 and lower gear housing 34 from shaft 37, so as to rotate shaft 38 about its own axis while revolving the latter shaft about an axis eccentric thereto. The transmission unit 33 preferably is similar to the unit disclosed in my copending application for Transmission unit, Serial No. 452,063, filed July 23, 1942. It may, however, be of any suitable known type, within the broader aspects of my invention. Suffice it to state that a suitable transmission unit is provided whereby rotation of shaft 37 causes rotation of shaft 38 as well as revolution of the latter shaft about an axis eccentric thereto, as stated.

A V pulley 40 is secured on the upper end of drive shaft 37 and receives a V belt 41, which passes about a V pulley 42 mounted on the upper end of shaft 43 of a vertically disposed electric motor 44, supported for adjustment toward and away from shaft 37. Pulley 42 is suitably connected to motor shaft 43 to be driven thereby, and comprises a lower member 45 and an upper member 46 movable toward and away from each other and yieldingly urged toward each other by a compression spring and associated parts (not shown) within a housing 47 extending upward from member 46. When motor 44 is in its position shown in Figure 1, belt 41 is adjacent the periphery of pulley 42 and shaft 37 is then driven at high speed. Adjustment of motor 44 away from shaft 37 causes movement of pulley 42 rearward relative to belt 41, with downward movement of member 45 and upward movement of member 46, thus reducing the effective pitch diameter of pulley 42 and correspondingly reducing the speed of drive of shaft 37. It is thus possible, by appropriate adjustment of motor 44, to vary the speed of drive of shaft 37 infinitely, within limits.

The pulley 42 is of known type, that shown being known as the Lewellen Vari-drive pulley, and need not be illustrated or described here in greater detail. Suffice it to state that means is provided whereby the speed of drive of shaft 37 may be varied by adjustment of motor 44 relative to this shaft, and my invention comprehends any suitable drive for accomplishing that result.

Motor 44 is bolted to front wall 49 of a suitably reinforced carriage 50 of substantially inverted U shape in side view. It will be understood, of course, that motor 44 may be bolted or otherwise suitably secured to back wall 51, or any other suitable portion of carriage 50. Back wall 51 of carriage 50 is provided, a short distance below its top, with two slots 52 (Figure 6) opening through the side edges of this wall. Front wall 49 is also provided with two slots 52 opening through its lateral edges. Each of these slots 52 receives a bushing 53 provided with a circumferential groove 54 which receives the edge portions of wall 51 adjacent slot 52. Carriage 50 is thus provided, at each side thereof, with two aligned bushings 53 fitting into the slots 52 and restrained against endwise movement relative to carriage 50. Two supporting and guide rods 55 are inserted through the aligned pairs of bushings 53, and have their forward end portions inserted through plate 28. The rearward plate 31 is provided with two vertical slots 56 opening through its upper edge, in which slots the rearward end portions of the rods 55 seat. Each rod 55 is provided with an upwardly opening transverse groove 57 which receives the lower portion of a locking bar 58 bolted to plate 31. Rods 55 are thus restrained against lengthwise movement, and motor carriage 50 is suspended from these rods and is slidably mounted thereon, by means of the bushings 53, for adjustment therealong toward and away from drive shaft 37.

Locking bar 58 is provided at one end thereof with an upwardly projecting extension 60, disposed above one of the rods 55. Extension 60 receives a flanged bearing bushing 61 (Figure 1) in which is rotatably mounted a reduced stud 62 at the rearward end of an adjusting shaft 63. Shaft 63 is provided with a threaded portion 64 which screws through a nut 65 mounted in a slot 66 opening through one side of back wall 51 of the motor carriage. Nut 65 is provided at its upper and its lower portion with an outwardly opening transverse groove having a straight inner wall or bottom, these grooves receiving the edge portions of wall 51 at the top and the bottom of slot 66, with the upper and lower edges of the slot in snug contact with the inner or bottom walls of the grooves in nut 65 effective for preventing rotation of this nut. This connection between the nut 65 and wall 61 also serves to restrain the nut against endwise movement relative to wall 51 and to connect it thereto for adjusting carriage 50. Shaft 63 passes through front wall 49 of carriage 50 and through a bearing bushing 68 mounted through front wall 30 of overhang 23 of head 22. Bushing 68 is provided with an upwardly opening transverse groove 69 (Figure 8) which receives the lower edge portion of a locking plate 70 bolted to the outer face of wall 30. A hand wheel 71 is suitably secured on the forward end of shaft 63 and is provided with a handle 72, for convenience in rotating this shaft. Hub 73 of hand wheel 71 contacts the outer end of bushing 68 and cooperates therewith for restraining shaft 63 against rearward movement. A thrust washer 74, of known type, is disposed about shaft 63, free therefrom, and in contact with the inner end of bushing 68. A worm gear 75 is disposed on shaft 63 with its forward end in contact with washer 74, and is secured to shaft 63 by means of a suitable pin 76. The thrust collar or washer 74 and the worm 75 cooperate with bushing 66 for restraining the shaft 63 against endwise movement in a forward direction. By rotating shaft 63 in proper direction, motor carriage 50 may be adjusted along rods 55 toward or away from drive shaft 37 for driving the latter at any desired speed, within limits.

Locking plate 70 is spaced from the front and the bottom walls of groove 69 of bushing 68, and the opening in wall 30 through which bushing 68 passes is of somewhat greater diameter than the bushing, as shown in Figure 8. Bushing 68 thus rests upon the edge of wall 30, at the lower portion of the opening, and is capable of rocking movement sufficient to accommodate slight inaccuracies in alignment of the bearings for shaft 63, due to inaccuracies in assembly or manufacture, often difficult to avoid in sheet or plate metal structures. In Figure 8 shaft 63 is indicated in dot and dash lines as being slightly inclined, due to misalignment of its bearings, such inclination of this shaft being accommodated by slight tilting or rocking of bushing 68, as will be clear. The bearing means referred to above, comprising bushing 68 and the associated parts, constitutes the subject matter of my copending application for Bearing structure, Serial No. 452,066, filed July 23, 1942.

Worm 75 meshes with a worm wheel 77 secured on an indicator shaft 78 rotatably mounted in a bracket 79 (Figure 4) secured to front wall 30 of overhang 23, above diaphragm plate 29. The end portions of shaft 78 may be rotatably mounted in bushings 80 extending through the side arms of bracket 79 and held in position by associated locking plates, in the same manner as bushing 68 is retained in position by locking plate 70. A bevel gear 81 is secured on shaft 78 and meshes with a bevel gear 82 (Figure 4) secured on the inner end of a stub shaft 83, passing through wall 30 and through a dial plate 84 secured on the outer face of the latter wall. A pointer 85, secured on the outer end of shaft 83, is movable over the dial plate 84, which is provided with a scale (Figure 2) to indicate the different speeds at which shaft 37 may be driven, the higher numbers of this scale indicating higher speeds, and vice versa. Rotation of shaft 63 in either direction causes rotation of indicator shaft 78 and of stub shaft 83, in proper direction and to proper extent, to indicate on the dial 84 the speed of drive shaft 37.

In order to remove the motor carriage 50, together with the motor 44 and associated parts, locking plate 70 is removed. After that has been done, shaft 63 is rotated in proper direction to cause forward movement thereof, with bushing 68 and worm gear 75, through wall 30, no movement of motor carriage 50 occurring, since the adjusting shaft 63 is then free to move forward relative to the carriage. After shaft 63 has been screwed out of nut 65, it may be withdrawn from head 22. Alternatively, shaft 63 may be screwed forwardly through nut 65 sufficiently to withdraw stud 62 from bushing 61, after which nut 65 may be moved out of slot 66, by springing shaft 63 slightly, and screwed off of shaft 63, the latter being then withdrawn through wall 30. By removing locking plate 58, the supporting and guide rods 55 are released and may be moved rearwardly slightly, sufficiently to withdraw them from plate 28, after which the motor carriage and motor, together with the rods 55 and the bushings 53, may be lifted as a unit upward out of the top of column 21, it being understood, of course, that the belt 41 is first removed from about the pulley 42. The rods 55 and bushings 53 may then readily be removed from the motor carriage, by moving the bushings outward through the slots 52. By reversing this operation the motor carriage and motor, together with the supporting and guide rods and associated parts, may be replaced in the column 21, as a unit, after which the locking bar is replaced and secured to plate 31, and shaft 63 is reinserted and threaded through nut 65 into position with stud 62 extending through bushing 61. It is thus possible to remove the motor carriage and associated parts as a unit, for cleaning, repairs, or the like, and to return this unit to the column 21 and reestablish operating connections between the motor carriage and the adjusting shaft 63, with expedition and facility, which is advantageous for obvious reasons.

Shaft 38 is intended for reception of various attachments for treating or mixing materials in a mixing bowl supported in proper relation to the attachment being used. In order that the bowl may be supported in proper position, I provide vertically adjustable bowl supporting means. The bowl support is of approximately U shape in plan, and comprises two forwardly and outwardly curved arms 88 (Figures 1, 2, and 3) of angle cross section, each provided, at its rearward end, with a sleeve 89 slidable on a vertical guide rod 90 suitably secured at its lower end to base 20 and extending upward therefrom into overhang 23 and through a plate 91 extending across the overhang and secured to the side walls thereof and to plate 28. The sleeves 89 are connected by a web element 92 having an opening receiving a block 93 provided in its sides with grooves 94 which loosely receive corresponding tongues 92a integral with web 92. Block 93 is centrally bored and threaded for reception of a threaded adjusting shaft screwing through this block and rotatably mounted at its lower end in base 20, shaft 95 being disposed midway between guide rods 90 in parallel spaced relation thereto. The upper end portion of shaft 95 is reduced and passes through and above a bearing bushing 96 mounted through plate 91. Bushing 96 is provided at opposite sides thereof with straight grooves, and guide rods 90 are likewise, provided at their inner sides and adjacent plate 91, with straight grooves. Locking plates 97 engage into the grooves of bushing 96 and rods 90 and are bolted to plate 91, effectively restraining the guide rods and the bushing, together with shaft 95, against endwise movement. A bevel gear 98 is secured on the upper end of shaft 95 and meshes with a bevel gear 99 secured on a cross shaft 100. Shaft 100 is rotatably mounted through a bushing 101 mounted through one side wall of head 22 and restrained against endwise movement by a locking plate 102, in the same manner as bushing 68 of Figure 8. A hand wheel 103, provided with a handle 104, is secured on the outer end of shaft 100 with its hub 105 in contact with the outer end of bushing 101. A stop collar 106 is secured on shaft 100 in contact with the inner end of bushing 101. Shaft 100 is thus restrained against endwise movement. The other or inner end of shaft 100 is rotatably mounted in a bushing 107 mounted through an angle bracket 108 extending between plate 91 and diaphragm plate 29, this bracket 108 being welded to plates 28, 91, and 29, and to the adjacent side wall of head 22. Bushing 107 is retained in position by a locking plate 110 bolted to bracket 108, in the same manner as bushing 101 and bushing 68 of Figure 8. Each of the arms 88 is provided, at its forward end, with a boss 112 in which is secured an upwardly projecting stud 113 for engagement through a corresponding opening in a plate 114 secured to a band 115 extending about a mixing bowl 116. Midway between the plates 114 an arcuate angle strip 117 is secured to band 115, this strip being provided with a rounded rib 118. A locking hook 119 extends upward through a slot 120, in flange 121 at the upper edge of and connecting the arms 88, this hook being pivoted at its lower end on a crank 122 of a rod 123 rockably mounted in arms 88 and confined against endwise movement. Rod 123 extends outward beyond one of the arms 88 and has an operating arm 124 secured on its outer end. By turning arm 124 in counterclockwise direction, as viewed in Figure 1, hook 119 is moved downward so as to cause the bill of the hook to engage over rib 118, rearward movement of the lower end of the hook being limited by a stop 125, conveniently in the form of a screw threaded into web 92, so disposed that the crank moves only a short distance rearward beyond dead center position. That provides means for locking the bowl 116 to the support in a manner effectively preventing accidental displacement of the bowl. By turning arm 124 in clockwise direction, as viewed in Figure 1, the bowl may be released for removal and replacement as required. It will be seen that by rotating shaft 100 in proper direction, the bowl 116 may be raised or lowered as desired so as to be positioned in proper relation to the attachment carried by the driven shaft 38. The loose tongue and groove connection between block 93 and the bowl support provides, in effect, a floating connection which accommodates any slight inaccuracy in parts and eliminates possibility of binding. The above described means for adjusting the bowl support constitutes the subject matter of my copending application for adjustable support, Serial No. 452,065, filed July 23, 1942.

Preferably, I provide means whereby auxiliary attachments, such as a meat chopper, tool grinder, fruit juice extractor, or other attachment may be driven from shaft 37. A take-off shaft 168 (Figure 4), suitably driven from shaft 37, extends toward one side wall of overhang 23 of head 22, coaxially with a cylindrical housing 182 extending from the outer face of that wall and bolted thereto. At its outer end shaft 168 is connected, by clutch members 187 and 187ª disposed in an opening 225 in diaphragm plate 29, to a driven member within housing 182. This housing 182 contains the driven member referred to and associated parts for mounting an attachment on housing 182 and establishing driving connection between the attachment and shaft 168. The outer end of housing 182 normally is closed by a removable cover plate 226, held in position in any suitable known manner. The means for mounting the attachment and connecting it to shaft 168 to be driven thereby constitutes the subject matter of my copending application for Power take-off, Serial No. 452,064, filed July 23, 1942, and need not be further described here. Suffice it to state that suitable means is provided for mounting an attachment and establishing driving connection between it and take-off shaft 168.

Shaft 38 is intended for reception of various attachments, as previously stated. In Figure 1 I have shown a beater 205 extending downward into bowl 116, this beater having an upwardly extending tubular shank 206 provided, at its upper end, with a shoulder 207. An attaching collar 210 is keyed on shaft 38 and secured thereto by a set screw 211. Collar 210 and beater 205 are provided with cooperating means for securing the beater upon shaft 38, comprising a locking pin (not shown) carried by collar 210 and provided with an operating handle 214. The referred to means for securing the attachment or beater 206 to shaft 38 constitutes the subject matter of my copending application for securing means, Serial No. 452,456, filed July 27, 1942, now Patent No. 2,309,249, and need not be further described here. Suffice it to state that suitable means is provided for securing the beater 206 or other attachment to shaft 38 for movement therewith.

Overhang 23 of the head 22 is provided, at its bottom, with an inwardly extending flange 220 (Figure 1) to which is removably secured a cover plate 221, by means of screws 222, or in any other suitable manner. Plate 221 is provided with a circular opening 223 of suitable diameter to accommodate collar 154 of the lower gear housing 36 during rotation thereof. A circular splash plate 224, of somewhat greater diameter than opening 223, is disposed below and adjacent plate 221 and is secured in position in any suitable manner.

Figure 10:
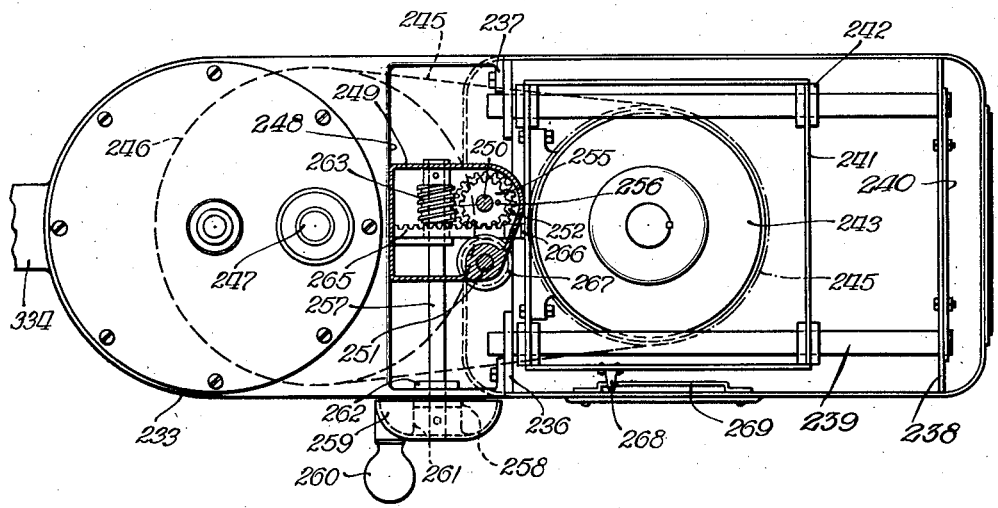
Figure 10 is a plan view of the machine of Figure 9 with the top cover removed and the pulleys and belt omitted for clearness of illustration.
Figure 11:
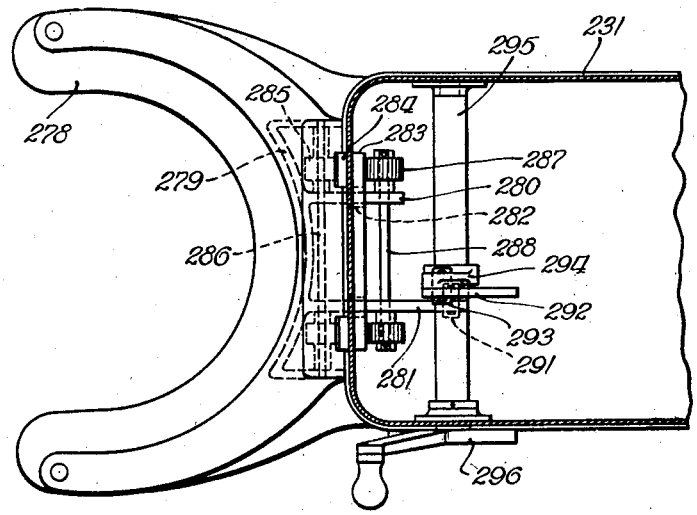
Figure 11 is a sectional view taken substantially on line 11—11 of Figure 9.

The modified form of machine shown in Figures 9 to 11, inclusive, comprises a base 230, which may be a casting, a column 231 suitably secured to base 230, this column being formed of sheet or plate metal of suitable gauge, with the parts thereof welded together, and a cover 232 seating upon the upper end of column 231, the upper portion of which provides a head, this head including a housing 233, which may be in the form of a casting, this housing extending forward from column 231 and overhanging the base 230. Cover 232 is preferably provided with a peripheral flange 234 welded thereto and extending downward therefrom to fit about the head at the upper portion of the column, including the housing 233. A relatively thick horizontally disposed plate 235 extends across column 231 and is welded thereto. A vertical plate 236 extends upward from the rearward edge of plate 235 to the top of coumn 231, at each side thereof, and is welded to the side wall of the column and to plate 235. Housing 233 seats, at its rearward portion, on plate 235 and is provided at its rearward end with lateral inwardly extending flanges 237 which seat against and are bolted to the vertical plate 236. In that manner, the housing 233 is removably secured to the upper or head portion of the column and may be readily removed and replaced as required.

A vertically disposed plate 238 extends across the upper or head portion of column 231 and is welded thereto. Plate 238 is provided with two slots opening through its upper edge, which slots receive the rearward end portions of two supporting and guide rods 239, the forward end portions of which are inserted through plates 236. A locking bar 240 is bolted to the rearward face of plate 238 and engages in slots cut in rods 239, adjacent the rearward ends thereof, for restraining these rods against endwise movement. A suitably reinforced motor carriage 241 is slidably mounted upon rods 239, by means of grooved bushings 242, in the manner previously described. An electric motor 243 is mounted on the front wall of carriage 241 and carries, at the upper end of its shaft, a Lewellen pulley 244. A V belt 245 passes about pulley 244 and about a V pulley 246, secured upon a drive shaft 247 of a transmission carried by casting 233. Adjustment of carriage 241 toward or away from shaft 247 serves to vary the speed of the latter shaft, in the manner previously described.

Casting 233 is provided, a short distance from the rearward end thereof, with a transverse web 248, to which web is bolted or otherwise suitably secured a bracket 249. Two vertical stub shafts 250 and 251 are mounted in bracket 249 in parallel spaced relation, as shown more clearly in Figure 10. A worm wheel 252 is rotatably mounted on shaft 250 and is secured to worm wheel 252 by a pin 256. An adjusting shaft 257 is rotatably mounted, at its inner end, in bracket 249 and, adjacent its outer end, is rotatably mounted in a boss 258 extending from one side wall of casting 233. A hand wheel 259, provided with a handle 260, is secured on the outer end of shaft 257 with its hub 261 in contact with boss 258. A stop collar 262 is secured upon shaft 257 at the inner face of the side wall of casting 233, this collar and hub 261 of the hand wheel 259 cooperating with boss 258 to restrain shaft 257 against endwise movement in either direction. A worm gear 263 is secured upon the inner end portion of shaft 257 and meshes with worm wheel 252 for rotating the latter, and with it the pinion 255, in either direction desired. A rack bar 265 is attached, at its rearward end, to the front wall of motor carriage 241, as by being pivoted between two angle brackets 266 welded or otherwise secured to the front wall of the carriage. Rack bar 265 meshes with pinion 255, movement of this bar away from the pinion being prevented by a flanged guide roller 267 mounted upon stub shaft 251 in contact with the face of the bar opposite to pinion 255, the flanges of this roller extending above and below bar 265. By rotating shaft 257 in proper direction, the motor carriage may be moved toward or away from shaft 247 for varying the speed of drive thereof. Conveniently, a pointer 268 is secured to one side of motor carriage 241 and is movable over a suitably marked plate 269 visible through an opening in the side of the column 231, this opening being covered by a transparent sheet 270 secured in position by plate 271 having an opening therein corresponding to the opening through the side wall of the column.

Shaft 247 serves to drive, through the transmission, a driven shaft 275 extending downward from a lower gear housing 309 of the transmission and adapted to receive various attachments secured thereto by a collar 276, secured on shaft 275, and associated means in the same manner as in Figure 1, it being noted, however, that shaft 275 extends downward into the upper portion of shank 206 of the attachment 205. Attachment 205 extends downward into a mixing bowl 277 mounted in a bowl support 278 of generally U shape in plan. Support 278 comprises a hollow back member 279, from which two arms 280 and 281 extend rearward through vertical slots 282 extending through the front wall of column 231 and a relatively heavy plate 283, welded to the inner face of that wall. Relatively thick strips 284 are welded to the outer face of the front wall of column 231, at the outer sides of slots 282, and provide tracks for guide rollers 285 carried by a shaft 286 mounted in the back member 279 transversely thereof. Inner guide rollers 287, mounted on a shaft 288 carried by the arms 280 and 281, travel on the plate 283 at the outer sides of slots 282. A second shaft 289, carried by arms 280 and 281, below and parallel with shaft 288, carries two guide rollers 290 which also travel on plate 283 adjacent the outer sides of the slots 282. The bowl support 278 is thus mounted for vertical movement, and is restrained against objectionable looseness or play by the guide rollers which facilitate adjustment of the support.

Arm 281 extends rearward to a greater extent than arm 280, as will be clear from Figures 9 and 10, and has pivoted thereto, at 291, the lower end of a curved link 292. The upper end of link 292 is pivoted at 293 to an arm 294 secured on the shaft 295, extending transversely of column 231 and mounted therein for turning movement adjacent the upper ends of the slots 282. Link 292 is so formed at its upper portion as to extend over shaft 295, with the pivot 293 disposed slightly forward of the axis of this shaft, when the latter is turned into position to raise the bowl support 278. A handle 296 is suitably secured upon one end of shaft 295, which extends through one side wall of column 231, for convenience in turning this shaft. When handle 296 is in the position shown in Figure 9, bowl support 278 is in its uppermost position, in which position it is retained due to the disposition of pivot 293 in advance of the axis of shaft 295. By turning handle 296 in clockwise direction, as viewed in Figure 9, the support 278 and the bowl 277 may be moved downward into the lowermost position of support 278.

A sleeve-like housing 334 extends from front wall 332 of casting 233 and houses parts of means for mounting attachments to be driven from the transmission, including a locking pin 341 restrained against endwise movement by a collar 342 secured upon its one end and an operating handle 343 secured upon its other end. The outer end of housing 334 normally is closed by a cover plate 346 removably secured thereon in a suitable known manner.

It will be understood, as above indicated, that various changes in construction and arrangement of parts of machines embodying my invention may be resorted to, without departing from the scope and field thereof, and I intend to include all such variations, as fall within the scope of the appended claims, in this application in which the preferred forms only of my invention have been disclosed.

I claim:

1. In a machine of the character described comprising a housing and a drive shaft and a motor with driving connections between the drive shaft and the shaft of the motor variable in speed by adjustment of said motor toward and away from said shaft, supporting and guide rods removably mounted in said housing and confined against endwise movement, a carriage for said motor supported by and slidable on said rods toward and away from said drive shaft, said rods being disposed outwardly beyond the motor and accessible from the exterior of said housing providing holds by means of which said rods and carriage and parts carried thereby may be removed from and replaced in said housing as a unit, and means for adjusting said carriage along said rods.

2. In a machine of the character described comprising an open top housing and a vertical drive shaft and a motor having a vertical shaft with driving connections between the drive shaft and the motor shaft variable in speed by adjustment of said motor toward and away from said shaft, supporting and guide rods removably mounted in said housing and confined against endwise movement, a carriage for said motor supported at its upper portion on said rods depending therefrom and slidable thereon toward and away from said shaft, said rods being disposed adjacent the upper portion of the motor outwardly therebeyond and accessible from the top of said housing providing holds by means of which said rods and carriage and parts carried thereby may be removed from and replaced in said housing as a unit, and means for adjusting said carriage along said rods.

3. In a machine of the character described comprising an open top housing and a shaft and a motor with driving connections therebetween variable in speed by adjustment of said motor toward and away from said shaft, spaced supporting members secured in said housing, one of said members having upwardly opening slots therein, supporting and guide rods each having one end portion inserted through the other supporting member and its other end portion seating in one of said slots and provided with a transverse groove adjacent said one member, a locking bar removably secured to said one member engaging in said grooves confining said rods against endwise movement, a carriage for said motor supported at its upper portion on said rods depending therefrom and slidable thereon toward and away from said shaft, said rods being disposed outwardly beyond the motor and accessible from the top of said housing providing holds by means of which said rods and carriage and parts carried thereby may be removed from and replaced in said housing as a unit, and means for adjusting said carriage along said rods.

4. In a machine of the character described comprising an open top housing and a shaft and a motor with driving connections therebetween variable in speed by adjustment of said motor toward and away from said shaft, spaced supporting members secured in said housing, supporting and guide rods having their end portions inserted through said members, means securing said rods against endwise movement removable for endwise withdrawal of said rods from said members, a carriage for said motor supported at its upper portion on said rods depending therefrom and slidable thereon toward and away from said shaft, said rods being disposed outwardly beyond the motor and accessible from the top of said housing providing holds by means of which said rods and carriage and parts carried thereby may be removed from and replaced in said housing as a unit, and means for adjusting said carriage along said rods.

5. In a machine of the character described comprising an open top housing and a shaft and a motor with driving connections therebetween variable in speed by adjustment of said motor toward and away from said shaft, spaced supporting members secured in said housing, supporting and guide rods having their end portions inserted through said members confined thereby against lateral and downward movement, means securing said rods against endwise movement removable for endwise and upward withdrawal of said rods from said members, a carriage for said motor having end walls each provided with slots opening through its lateral edges, grooved bushings slidable on said rods toward and away from said shaft fitting in said slots and receiving the adjacent portions of said walls, said rods being disposed outwardly beyond the motor and accessible from the top of said housing providing holds by means of which said rods and carriage and parts carried thereby may be removed from and replaced in said housing as a unit, and means for adjusting said carriage along said rods.

6. In a machine of the character described comprising an open top housing and a shaft and a motor with driving connections therebetween variable in speed by adjustment of said motor toward and away from said shaft, spaced supporting members secured in said housing, supporting and guide rods having their end portions inserted through said members confined thereby against lateral and downward movement, means securing said rods against endwise movement removable for endwise and upward withdrawal of said rods from said members, a carriage for said motor supported by said rods slidable thereon toward and away from said shaft, said rods being disposed outwardly beyond the motor and accessible from the top of said housing providing holds by means of which said rods and carriage and parts carried thereby may be removed from and replaced in said housing as a unit, and a removable screw shaft mounted in a wall of said housing confined against endwise movement and having threaded connection to said carriage for adjusting the latter along said rods.

7. In a machine of the character described comprising an open top housing and a shaft and a motor with driving connections therebetween variable in speed by adjustment of said motor toward and away from said shaft, spaced supporting members secured in said housing, supporting and guide rods having their end portions inserted through said members, means securing said rods against endwise movement removable for endwise and upward withdrawal of said rods from said members, a carriage for said motor supported by said rods slidable thereon toward and away from said shaft, a bearing bushing releasably secured in an opening in a wall of said housing, a screw shaft mounted through said bushing, inner and outer abutment members on said shaft adjacent the ends of said bushing restraining said shaft against endwise movement through said bushing, and a nut secured to said carriage receiving said shaft for adjustment thereby of said carriage along said rods, said shaft and bushing and inner abutment member being movable outward through said opening when said bushing is released from said wall, said rods being disposed outwardly beyond the motor and accessible from the top of said housing providing holds by means of which said rods and carriage and parts carried thereby may be removed from and replaced in said housing as a unit.

8. In a machine of the character described comprising an open top housing and a shaft and a motor with driving connections therebetween variable in speed by adjustment of said motor toward and away from said shaft, spaced supporting members secured in said housing, supporting and guide rods having their end portions inserted through said members, means securing said rods against endwise movement removable for endwise and upward withdrawal of said rods from said members, a carriage for said motor supported by said rods slidable thereon toward and away from said shaft, a bearing bushing releasably secured in an opening in a wall of said housing, a screw shaft mounted through said bushing, a handle secured on the outer end of said shaft restraining it against endwise movement in one direction through said bushing, abutment means secured on said shaft adjacent the inner end of said bushing restraining said shaft against endwise movement through said bushing in the other direction, and a nut secured to said carriage receiving said shaft for adjustment thereby of said carriage along said rods, said shaft and bushing and abutment means being movable outward through said opening when said bushing is released from said wall, said rods being disposed outwardly beyond the motor and accessible from the top of said housing providing holds by means of which said rods and carriage and parts carried thereby may be removed from and replaced in said housing as a unit.

9. In a machine of the character described, a tubular supporting column having at its upper end a head providing an open top housing extending forwardly of said column providing an overhang, vertical supporting plates secured in said housing transversely thereof adjacent the front and the rear of and overlying said column, a transmission unit mounted in said overhang having a drive shaft, supporting and guide rods extending between said plates with their end portions inserted therethrough, means securing said rods against endwise movement removable for endwise and upward withdrawal of said rods from said plates, a carriage depending from and slidable along said rods toward and away from said shaft, a motor on said carriage, driving connections between said motor and said drive shaft variable in speed by adjustment of said motor toward and away from said drive shaft, and means for adjusting said carriage along said rods, the latter being disposed outwardly beyond the motor and accessible from the top of said housing providing holds by means of which said rods and carriage and parts carried thereby may be removed from and replaced in said housing as a unit.

10. In a machine of the character described, a tubular supporting column having at its upper end a head providing an open top housing extending forwardly of said column providing an overhang, vertical supporting plates secured in said housing transversely thereof adjacent the front and the rear of and overlying said column, a transmission unit mounted in said overhang having a drive shaft, supporting and guide rods extending between said plates with their end portions inserted therethrough, means securing said rods against endwise movement removable for endwise and upward withdrawal of said rods from said plates, a carriage depending from and slidable along said rods toward and away from said shaft, a motor on said carriage, driving connections between said motor and said drive shaft variable in speed by adjustment of said motor toward and away from said drive shaft, a screw shaft rotatably mounted through a wall of said housing overlying said carriage and having threaded connection thereto for adjusting said carriage along said rods, and means normally restraining said shaft against endwise movement in either direction and releasable to permit endwise withdrawal thereof through said wall, said rods being disposed outwardly beyond the motor and accessible from the top of said housing providing holds by means of which said rods and carriage and parts carried thereby may be removed from and replaced in said housing as a unit.

11. In a machine of the character described, an open top housing, a transmission unit mounted in said housing having a vertical drive shaft, supporting plates secured in said housing transversely thereof, one of said plates having upwardly opening slots therein, supporting and guide rods extending between said plates resting at one end in said slots and having their other end portions inserted in but free from the other plate for withdrawal therefrom, a locking plate removably secured to said one supporting plate, the locking plate and the adjacent end portions of said rods having cooperating means restraining said rods against upward and endwise movement while permitting endwise and upward movement of said rods for withdrawal thereof from said supporting plates when said locking plate is removed, a motor carriage slidable on and depending from said rods, a motor mounted on said carriage with its shaft disposed vertically, driving connections between said transmission shaft and said motor shaft variable in speed by adjustment of said motor toward and away from said transmission shaft, said connections comprising a pulley secured on the upper end of the motor shaft, and removable means for adjusting said carriage, said rods being disposed adjacent the upper end of said motor outwardly therebeyond and outwardly beyond said pulley so as to be readily accessible from the top of the housing providing hold means by means of which said rods and carriage and parts carried thereby may be removed from and replaced in said housing as a unit.

12. In a machine of the character described, an open top housing, a transmission unit mounted in said housing having a vertical drive shaft, supporting plates secured in said housing transversely thereof, one of said plates having upwardly opening slots therein, supporting and guide rods extending between said plates resting at one end in said slots and having their other end portions inserted in but free from the other plate for withdrawal therefrom, a locking plate removably secured to said one supporting plate, the locking plate and the adjacent end portions of said rods having cooperating means restraining said rods against upward and endwise movement while permitting endwise and upward movement of said rods for withdrawal thereof from said supporting plates when said locking plate is removed, a motor carriage having end walls each provided at each side thereof with an outwardly opening slot, externally grooved bushings removably mounted in the slots of said end walls in engagement with said walls and slidably supporting said carriage on said rods depending therefrom, a motor mounted on said carriage with its shaft disposed vertically, driving connections between said transmission shaft and said motor shaft variable in speed by adjustment of said motor toward and away from said transmission shaft, said connections comprising a pulley secured on the upper end of the motor shaft, and removable means for adjusting said carriage, said rods being disposed adjacent the upper end of said motor outwardly therebeyond and outwardly beyond said pulley so as to be readily accessible from the top of the housing providing hold means by means of which said rods and carriage and parts carried thereby may be removed from and replaced in said housing as a unit.

EDWARD J. KARP.